United States Patent Office 3,406,148
Patented Oct. 15, 1968

3,406,148
CROSS-LINKED POLYIMIDES AND METHODS OF PRODUCING SAME FROM HALOGENATED N,N'-BIS-MALEIMIDES
Joerg Sambeth, Carouge, Geneva, and Friedrich Grundschober, Confignon, Geneva, Switzerland, assignors to Societe Rhodiaceta, Paris, France, a French body corporate
No Drawing. Continuation-in-part of application Ser. No. 507,656, Nov. 15, 1965. This application May 9, 1967, Ser. No. 637,054
Claims priority, application Switzerland, May 11, 1966, 6,863/66
9 Claims. (Cl. 260—47)

ABSTRACT OF THE DISCLOSURE

Cross-linked polyimides are produced by polymerizing a halogenated N,N'-bis-maleimide. These polymers are non-inflammable and have high mechanical and thermal strength and are used in construction and in particular as thermal and electrical insulators.

---

The present invention relates to cross-linked polyimides and to their production and is an improvement or modification of the invention described and claimed in our co-pending patent application Ser. No. 507,656 filed Nov. 15, 1965.

The cross-linked polyimides disclosed in the above patent application consist of the following structural unit:

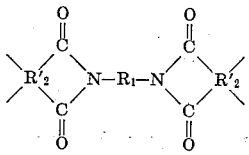

wherein $R_1$, which stands for a bivalent radical containing at least two carbon atoms, is a substituted or unsubstituted alkyl residue, or a substituted or unsubstituted aryl residue, either hydrogenated or not, or substituted or unsubstituted aryl residues, either hydrogenated or not, bonded by at least one of the following radicals: $-CH_2-$, $-SO_2-$ and $-O-$, and wherein $R'_2$ is a tetravalent radical containing at least two carbon atoms, two of the valencies, carried by two different carbon atoms, being saturated by two carboxyl groups and the other two valencies being carried by adjacent cabon atoms.

Such cross-linked polyimides are infusible and insoluble in organic solvents and have high mechanical strength and thermal stability. They are however inflammable, thereby restricting their applications in certain fields.

An object of the present invention is to provide cross-linked polyimides which are non-inflammable.

The cross-linked polyimides provided by the present invention consist of the following structural unit:

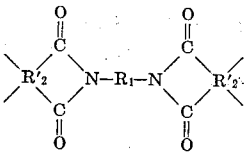

wherein $R_1$, is selected from the group consisting of an arylene residue, a halogen substituted arylene residue, a plurality of said residues bonded together either directly or by at least one of the following radicals:

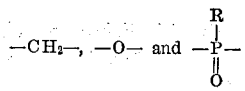

wherein R is an aryl group; and wherein $R'_2$ is a tetravalent radical having the formula:

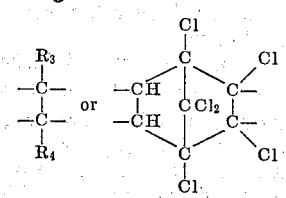

wherein $R_3$ and $R_4$ are hydrogen or halogen atoms, said plurality of structural units being bonded together by the $R'_2$ radical and when $R'_2$ is

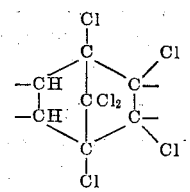

said $R'_2$ is bonded to the CO groups in said structural unit through the free valences of the CH groups and wherein at least one of the radicals $R_1$ and $R_2$ contain at least one halogen atom.

The invention also provides a method of producing such a cross-linked polyimide. This method comprises heating at a temperature ranging from 80° to 400° C. for the length of time necessary to obtain said polymer, at least one N,N'-bis-imide of an unsaturated dicarboxylic acid of general formula

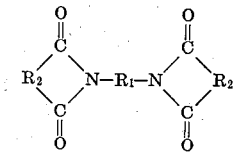

wherein $R_1$ is as defined above and $R_2$ is a bivalent radical having the formulae

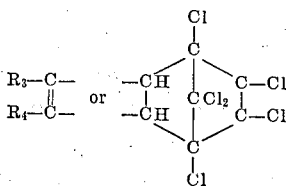

where $R_3$ and $R_4$ are hydrogen atoms or halogen atoms and wherein at least one of the radicals $R_1$ and $R_2$ contain at least one halogen atom.

The method thus consists in polymerizing at least one halogenated N,N'-bis-imide. Such a bis-imide may be produced from a halogenated diamine and an unsaturated dicarboxylic acid anhydride, from a diamine and an unsaturated and halogenated dicarboxylic acid dianhydride, or from a halogenated diamine and an unsaturated and halogenated dicarboxylic acid anhydride.

N,N'-bis-imides of the following acids will preferably be used, maleic, dichloromaleic and chlorendic, in particular:

N,N'-(4-chloro-1,3-phenylene) bis-maleimide
N,N'-(2,5-dichloro-1,3-phenylene) bis-maleimide
N,N'-(3,3'-dichloro-4,4'-diphenylether) bis-maleimide N,N'-(3,3'-dichloro-4,4'-biphenylene) bis-maleimide
N,N'-(3,5,3',5'-tetrachloro-4,4'-biphenylene) bis-maleimide
N,N'-(3,3'-dibromo-4,4'-biphenylene) bis-maleimide
N,N'-(3,3'-dichloro-4,4'-diphenylmethane) bis-maleimide
N,N'-(4,4'-triphenylphosphine-oxide) bis-dichloromaleimide
N,N'-4,4'-diphenylether-bis-dichloromaleimide
N,N'-(3,3'-dichloro-4,4'-biphenylene) bis-dichloromaleimide
N,N'-(3,3'-dibromo-4,4'-diphenylmethane) bis-dichloromaleimide
N,N'-4,4'-diphenylether-bis-hexachloroendomethylene-tetrahydrophthalimide
N,N'-(2,2'-dichloro-3,3'-dimethyl-4,4'-biphenylene) bis-hexachloroendomethylenetetrahydrophthalimide The polymerization reaction may be carried out in the presence of a catalyst capable of supplying free radicals, such as, for instance, a peroxide, in particular dicumylperoxide and dibenzoylperoxide. Use may also be made of azo derivatives such as, for instance, azo-bis-isobutyronitrile.

As for the quantity of catalyst to be used, it must be so chosen that the molar ratio of the bis-imide and of the catalyst lies between 1:0.001 and 1:0.05.

The following examples further illustrate the invention:

Example 1

10 g. of N,N'-(3,3'-dichloro-4,4'-biphenylene) bis maleimide were heated at 350° C. The molten product solidified and was then heated for 38 hours at 220° C. The resultant solid body was non inflammable and insoluble in all solvents; it decomposed at about 470° C.

Example 2

10 g. of N,N'-4,4'-diphenylether-bis-dichloromaleimide were heated at 270° C. The molten product solidified and was then heated for 38 hours at 220° C. The resultant solid body was non inflammable and insoluble in all solvents; it decomposed at over 500° C.

Example 3

10 g. of N,N'-4,4'-diphenylether-bis-hexachloroendomethylene-tetrahydrophthalimide were heated at 360° C. The molten product solidified and was then heated for 38 hours at 220° C. The resultant solid body was non inflammable and insoluble in all solvents; it decomposed at over 500° C.

Example 4

3 g. of N,N'-(3,3'-dichlorobiphenylene) bis-maleimide and 7 g. of N,N'-4,4'-diphenylether-bis-maleimide were heated at 250° C. The molten product solidified and was then heated for 38 hours at 220° C. The resultant solid body was insoluble in all solvents; it decomposed at about 470° C.

Example 5

5 g. of N,N'-4,4'-diphenylether-bis-dichloromaleimide and 5 g. of N,N'-4,4'-diphenylether-bis-maleimide were heated at 240° C. The molten product solidified and was then heated for 38 hours at 220° C. The resultant solid body was insoluble in all solvents; it decomposed at about 470° C.

Example 6

3 g. of N,N'-4,4'-diphenylether-bis-hexachloroendomethylenetetrahydrophthalimide and 7 g. of N,N'-4,4'-diphenylether-bis-maleimide were heated at 250° C. The molten product solidified and was then heated for 38 hours at 220° C. The resultant solid body was insoluble in all solvents; it decomposed at about 470° C.

Example 7

10 g. of N,N'-(3,3'-dichloro-4,4'-biphenylene) bis-dichloromaleimide were heated at 350° C. The molten product solidified and was then heated for 38 hours at 220° C. The resultant solid body was non inflammable and insoluble in all solvents; it decomposed at about 470° C.

Example 8

10 g. of N,N'-(2,5-dichloro-1,3-phenylene) bis-maleimide were mixed with 0.02 g. of dicumylperoxide and the mixture was heated at 270° C. The molten product solidified and was then heated for 38 hours at 220° C. The resultant solid body was non inflammable and insoluble in all solvents; it decomposed at about 470° C.

Example 9

10 g. of N,N'-(3,3'-dibromo-4,4'-biphenylene) bis-maleimide were heated at 360° C. The molten product solidified and was then heated for 38 hours at 220° C. The resultant solid body was non inflammable and insoluble in all solvents; it decomposed at about 470° C.

Example 10

10 g. of N,N'-(4,4'-triphenylphosphine oxide) bis-dichloromaleimide were heated at 360° C. The molten product solidified and was then heated for 38 hours at 220° C. The resultant solid body was non inflammable and insoluble in all solvents; it decomposed at about 460° C.

As will be apparent from these few examples, these new polyimides are non inflammable. They also have high mechanical strength and thermal stability. These resins will find an application wherever such properties are required, in particular in construction and in thermal and electrical insulations.

What is claimed is:

1. A cross-linked polyimide consisting of a plurality of the following structural units:

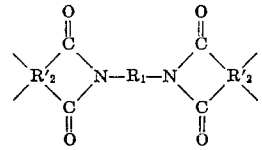

wherein $R_1$ is selected from the group consisting of an arylene residue, a halogen substituted arylene residue, a plurality of said residues bonded directly to each other and a plurality of said residues bonded to one another by at least one of the following radicals: —CH$_2$—, —O— and

wherein R is an aryl group; and wherein $R'_2$ is a tetravalent radical having the formulae:

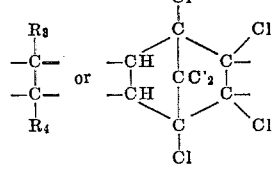

wherein $R_3$ and $R_4$ are hydrogen or halogen atoms, said plurality of structural units being bonded together by the $R'_2$ radical and when $R'_2$ is

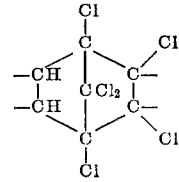

said $R'_2$ is bonded to the CO groups in said structural unit through the free valences of the CH groups and wherein at least one of the radicals $R_1$ and $R'_2$ contain at least one halogen atom.

2. A polyimide according to claim 1, which is a polymer of a maleic, dichloromaleic or chlorendic acid N,N'-bis-imide.

3. A polyimide according to claim 2, wherein the maleic, dichloromaleic or chloroendic acid N,N'-bis-imide is selected from the group consisting of:

N,N'-(4-chloro-1,3-phenylene) bis-maleimide,
N,N'-(2,5-dichloro-1,3-phenylene) bis-maleimide,
N,N'-(3,3'-dichloro-4,4'-diphenylether) bis-maleimide,
N,N'-(3,3'-dichloro-4,4'-biphenylene) bis-maleimide,
N,N'-(3,5,3',5'-tetrachloro-4,4'-biphenylene) bis-maleimide,
N,N'-(3,3'-dibromo-4,4'-biphenylene) bis-maleimide,
N,N'-(3,3'-dichloro-4,4'-diphenylmethane) bis-maleimide,
N,N'-(4,4'-triphenylphosphine-oxide) bis-dichloromaleimide,
N,N'-4,4'-diphenylether-bis-dichloromaleimide,
N,N'-(3,3'-dichloro-4,4'-biphenylene) bis-dichloromaleimide,
N,N'-(3,3'-dibromo-4,4'-diphenylmethane) bis-dichloromaleimide,
N,N'-4,4'-diphenylether-bis-hexachloroendomethylenetetrahydrophthalimide and
N,N'-(2,2'-dichloro-3,3'-dimethyl-4,4'-biphenylene) bis-hexachloroendomethylenetetrahydrophthalimide.

4. A method of producing a cross-linked polyimide, which comprises heating at a temperature ranging from 80° to 400° C., for the length of time necessary to obtain said polymer, at least one N,N'-bis-imide of an unsaturated dicarboxylic acid of the general formula:

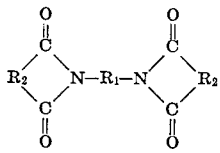

wherein $R_1$ is selected from the group consisting of an arylene residue, a halogen substituted arylene residue, a plurality of said residues bonded directly to each other and a plurality of said residues bonded to one another by at least one of the following radicals: —CH$_2$, —O— and

wherein R is an aryl group; and $R_2$ is a bivalent radical having the formulae:

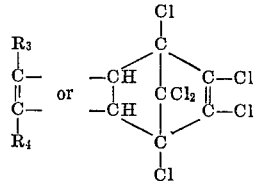

wherein $R_3$ and $R_4$ are hydrogen or halogen atoms and wherein at least one of the radicals $R_1$ and $R_2$ contain at least one halogen atom.

5. A method according to claim 4 wherein said N,N'-bis-imide is selected from the group consisting of:

N,N'-(4-chloro-1,3-phenylene) bis-maleimide,
N,N'-(2,5-dichloro-1,3-phenylene) bis-maleimide,
N,N'-(3,3'-dichloro-4,4'-diphenylether) bis-maleimide,
N,N'-(3,3'-dichloro-4,4'-biphenylene) bis-maleimide,
N,N'-(3,5,3',5'-tetrachloro-4,4'-biphenylene) bis-maleimide,
N,N'-(3,3'-dibromo-4,4'-biphenylene) bis-maleimide,
N,N'-(3,3'-dichloro-4,4'-diphenylmethane) bis-maleimide,
N,N'-(4,4'-triphenylphosphine-oxide) bis-dichloromaleimide,
N,N'-4,4'-diphenylether-bis-dichloromaleimide,
N,N'-(3,3'-dichloro-4,4'-biphenylene) bis-dichloromaleimide,
N,N'-(3,3'-dibromo-4,4'-diphenylmethane) bis-dichloromaleimide,
N,N'-4,4'-diphenylether-bis-hexachloroendomethylenetetrahydrophthalimide and
N,N'-(2,2'-dichloro-3,3'-dimethyl-4,4'-biphenylene) bis-hexachloroendomethylenetetrahydrophthalimide.

6. A method according to claim 4 wherein said N,N'-bis-imide is heated at a temperature ranging from 100° to 300° C.

7. A method according to claim 4 wherin said N,N'-bis-imide is heated in the presence of a catalyst capable of supplying free radicals.

8. A method according to claim 7, wherein said catalyst is selected from the group consisting of dicumylperoxide, dibenzoylperoxide and azo-bis-isobutyronitrile.

9. A method according to claim 7 wherein the catalyst and the N,N'-bis-imide are present in a molar ratio of 0.001–0.05:1.

No references cited.

WILLIAM H. SHORT, *Primary Examiner.*

L. LEE, *Assistant Examiner.*